Aug. 12, 1969 L. E. ASKE 3,460,249
METHOD OF MAKING CONTROLLERS
Filed May 2, 1966

INVENTOR.
LEONARD E. ASKE
BY
ATTORNEY

United States Patent Office 3,460,249
Patented Aug. 12, 1969

3,460,249
METHOD OF MAKING CONTROLLERS
Leonard E. Aske, Minneapolis, Minn., assignor to Honeywell Inc., Minneapolis, Minn., a corporation of Delaware
Filed May 2, 1966, Ser. No. 546,787
Int. Cl. B23k 31/02
U.S. Cl. 29—622                                4 Claims

ABSTRACT OF THE DISCLOSURE

A rotatable member of a rotary type switch is obtained by bonding metallic commutation strips to inner ceramic rings at a high temperature and thereafter bonding the ceramic rings to a shaft at a lower temperature.

---

This invention relates to controllers and includes controllers of the manually operated type. The controller herein is an electric switch and in particular a low torque electric switch of the rotary type for controlling several circuits in response to rotation of its control shaft. Such rotary switch may be used to control the energization of a plurality of reaction jets in response to rotation of the shaft from a manual controller.

It is an object of this invention to design a rotary switch whereby the entire operational switch component package will not be affected by the following environments—pressure changes, salt, humidity, explosive atmospheres, hot and cold cycling, vibration, shock acceleration, acceleration, and hard vacuum.

It is a further object of this invention to provide a rotary switch which is *extremely low in torque* vs. *rotation characteristics* and is essentially smooth (sliding contacts)—with no variable torque detent stiction discontinuities or contact bounce as are present in any cam, rocker arm, and roller actuated switches.

It is an object of this invention to provide a switch with the proper switch materials which will not out-gas during the extremely hot arc present within the switch enclosure causing carbon vapor deposits contaminating the surrounding inert dry nitrogen gas to cause switch failure due to arc over to various insulated areas within switch package enclosure.

According to the present invention, the switch includes a plurality of switch units each comprising a circular member supporting commutator segments disc and a pair of brushes engageable with the peripheral portion of the segments.

The commutator segments are circumferentially spaced on the circular member about the shaft so that upon rotation of the shaft various circuits may be controlled in sequence to operate the desired reaction jets.

The present invention also comprises novel methods of fabrication of this rotational switch involving methods of bonding the circular member to the drive shaft to provide a desirable heat conducting path and methods of bonding commutator elements or segments to the circular member of the switch. Thus the present invention also consists in a novel method of bonding a metal shaft to a circular ceramic member comprising the steps of applying a gold plate to a stainless steel shaft; metallizing an area about a central opening in a circular ceramic member, said metallized area consisting of sintered moly-manganese coating, and subsequently applying a nickel plate coating to the metallized portion. Thereafter with the stainless steel shaft inserted in the central opening of the ceramic member, indium solder preform ring having a low melting or fusing point, roughly 250 degrees F., is placed about the shaft within the opening of the ceramic member and heat is applied causing a fusing or bonding of the circular ceramic member to the shaft.

The invention further comprises providing a commutator member by taking a metal ring consisting roughly of tungsten 85% and silver 15% to provide slip rings; metallizing the periphery of the circular ceramic member and soft soldering the rings to the ceramic member with a 60% lead– 40% tin solder having a melting point roughly of 375 degrees F. and thereafter cutting axial slots in the periphery of the ring to form segments of the ring which are electrically insulated from each other by the ceramic material.

The invention will be described by way of example with reference to the accompanying drawings in which.

Figure 1:
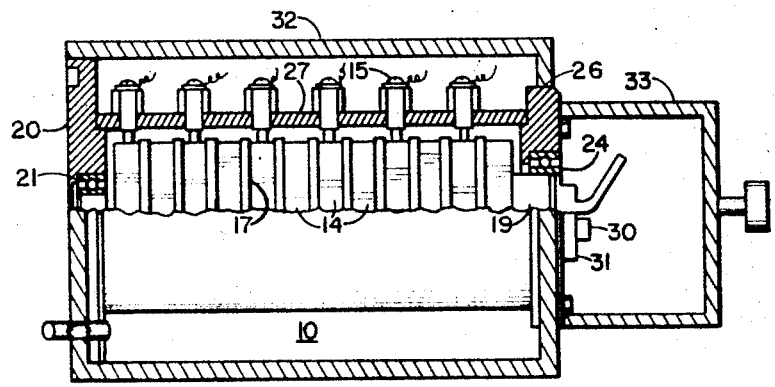
FIGURE 1 is a partial sectional view of the multisectional rotary switch.

Referring to FIGURE 1, the rotary switch 10 for purposes of illustration is shown with 12 switch sections each section comprising a commutator or sector rings 14 having conducting brushes 15 bearing on cut segments or the periphery thereof. Intermediate adjacent sector commutator rings 14 is a ceramic insulator barrier separator 17. The commutator sector rings and barrier separators are carried on a shaft 19. One end of the shaft 19 is supported in a ball bearing 21 which is press fitted into one end member 20. Such bearing is lubricated prior to assembly of the switch and tthe lubricant is not affected by hard vacuum exterior to the case 32 of switch 10. The right end of the shaft 19 viewed as in FIGURE 1 is supported in a second bearing 24 suitably fitted in the right end 26. The brushes 15 which bear on the commutator members or rings 14 are supported in a ceramic casing 27. The end members 20, 26 and the casing 27 are held together by suitable studs (not shown) which have one end embedded in the end member 20.

The studs extend within the inside diameter of the brush holder 27 and have threaded portions which extend through the right end member 26. The right end member 26 has recessed apertures therein and suitable fastening means such as hexagonal nuts may be threaded on to the projecting studs whereby to clamp the two end members and the brush holder together as a unit.

Figure 4:
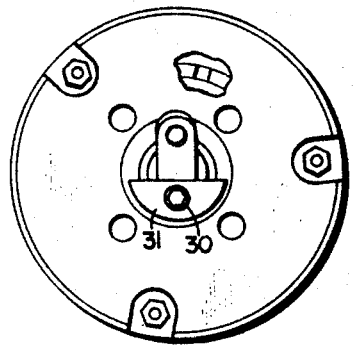
FIGURE 4 is a view from the right end of FIGURE 1.

As shown more clearly in FIGURE 4, a semi segmental plate 31 having an outside diameter slightly larger than the inner diameter of bearing race 24 is supported on shaft 19 by a suitable hold down screw 30. The screw 30 may be adjusted to exert an axial force on shaft 19 to properly position the commutator sections 14 relative to their brushes 15. The relative width of the brushes and commutators shown in FIGURE 1 is exaggerated and actually the brushes are substantially the same width as the commutator axial dimension. The switch assembly is hermetically sealed in outer casing 32 in a dry nitrogen environment at one atmosphere pressure to prevent oxidation within the switch package. External circuits are provided through casing 32 by suitable connections that prevent leakage of the casing. Operation of shaft 19 is achieved by a rotary to rotary bellows sealed drive 33.

Figure 2:
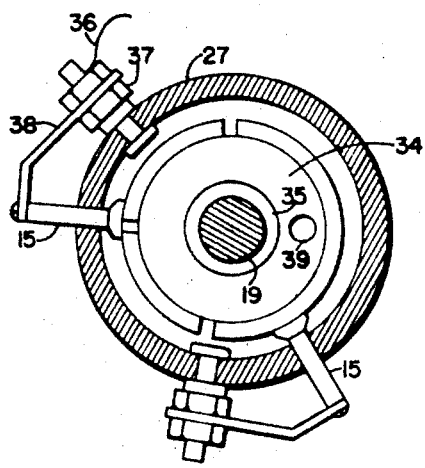
FIGURE 2 is a cross section showing the arrangement of element of one section of the multisection switch.

FIGURE 2 shows a typical switch section of the multisection rotary switch 10. In FIGURE 2, a brush 15 consisting roughly of 85% tungsten and 15% silver engages the commutator sections of ring 14 upon rotation of shaft 19. Shaft 19 is of stainless steel and has applied thereto a gold plating for solder ability. Concentric with the axis of the shaft is a circular ceramic wafer or member 34 having a central opening through which the shaft 19 passes. The ceramic wafer is fixed to the shaft by a method to be described. The periphery of the circular ceramic ring 34 has secured thereto commutator segments of commutator 14 of which 3 are shown in FIGURE 2. As stated the peripheries of the commutator segments are engaged by a brush 15 which is supported or guided in radial openings in cylindrical ceramic case 27. The case 27 serves as a mounting means for a commutator ring brush support 37 fixed thereto. The brush support has lead in wires extending therefrom such as wire 36 in FIGURE 2. The brush support 37 through spring fingers 38 supports the individual brushes 15 and radially biases them into engagement with the commutator ring 14.

The circular ceramic ring or wafer 34 has an opening hole 39 which receives a guide pin, and this guide pin is common to all of the similar ceramic rings 34 of the other sections. The guide pin is only used during fabrication of a switch. The guide pin and openings 39 are used for purposes of aligning the ceramic sector rings in proper circumferential angular relationship during fabrication as will be described.

Figure 3:
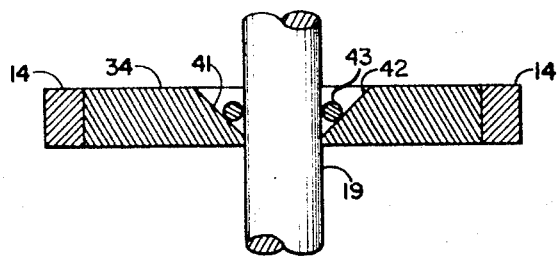
FIGURE 3 is a detailed sectional view showing how the movable part of a switch section is fabricated.

The method of fabricating a switch section will be considered with respect to FIGURE 3. In FIGURE 3, a circular ceramic member or disc 34 is provided with a central opening which receives a gold plated stainless steel shaft 19. For the purpose of providing a good heat conducting path between the ring 34 and shaft 19, a portion of the ring 34 is chamfered or cut away as at 41 providing a somewhat inverted conical shaped receptacle. The chamfered portion of the ring 34 is provided with a metallized surface for soft solder ability. This metallized surface consists of a layer of moly-manganese which is sintered and thereafter has a nickel plate applied thereto. By means of the alignment opening 39 (FIGURE 2) and a suitable pin passing therethrough, a plurality of the ceramic discs and separators may be placed on shaft 19 with the individual ceramic rings 34 properly located by means of the guide opening 39 in proper circumferential angular position on the shaft for proper circuit closing and opening conditions. A strip of indium solder having a low fusion or melting point, such as 250 degrees F., is applied in the cup shaped receptacle between the plated chamfered portion 42 and shaft 19 and thereafter heat may be applied to the assembly causing solder bonding of the ceramic rings 34 to the shaft 19.

The method of fabricating the commutator strips on commutator rings 14 involves a process carried out at higher temperatures such as at 375 degrees F. Prior to assembling the ceramic rings 34 and shaft 19, a slip ring consisting of approximately 85% tungsten and 15% silver is soldered to the metallized periphery of ceramic ring 34 by 60% lead–40% tin solder with a melting point of 375 degrees F. Thereafter, axial narrow slots are made in the periphery of the tungsten-silver metal ring on the periphery of ceramic ring 34 to provide the commutator sections of ring 14. Such slots in the ring are to be cut radially to remove all metal at the bottom of each slot of ring 34 by a suitable cutting tool to provide clean slots. Such slots are less in width than that of brushes 15 to prevent a brush from entering a slot—slot width is approximately one-fifth of the brush length.

It will be evident thus far that the multicontact multi-section rotary switch is constituted of ceramics and metals, and consequently during operation at cold (−60 degrees F.) and hot (180 degrees F.) operating temperatures they will not cause any out-gasing in the nitrogen environment and no carbon deposits to contaminate the nitrogen atmosphere as would occur if epoxy or plastic materials were used in the fabrication of the switch. It is also now evident that since the switches are of the commutator type that an extremely low torque is sufficient to operate the switch compared with the torque required, for example, to operate over-center snap acting switches by means of cams and rocker arms mounted on a rotatable shaft. A circuit may be completed through leadin wires connected to the brush holders when, for example, both brushes in a section contact a common sector segment member, and the silver-tungsten brushes and rings prevent arc erosion during switching the inductive load. It is also evident that due to the absence of out-gasing elements in the switch that arcing occurring between the commutator segment of ring 14 and the brushes 15 and the resulting heating causes no oxidation from out-gasing otherwise present if epoxy or plastic parts were used.

What is claimed is:
1. In a rotary switch, the method of bonding a plurality of ceramic discs to a metal shaft comprising:
   making central openings in said discs;
   radially removing material of the discs in at least a portion of the central areas thereof surrounding said openings;
   inserting a shaft in the openings of said discs;
   inserting a low fusion temperature strip of metal intermediate said shaft and the portions of the ceramic discs adjacent the openings;
   arranging said shaft so that said portions are directed generally upwardly; and
   applying heat to melt said strip of metal and bonding said discs to said shaft.

2. In a rotary switch, the method of providing an arcuate switch segment comprising:
   bonding a metallic ring or annulus to a circular ceramic ring member;
   forming axial slots in said bonded ring member; and
   bonding said ceramic ring member to a drive shaft wherein the last named bonding is effected at a lower temperature than said first named bonding.

3. The method of claim 1, including making a similar alignment opening in all of said discs prior to mounting them on said shafts and passing an alignment rod through all of said openings to properly peripherally space said ceramic rings on said shaft prior to application of heat.

4. The method of bonding a ceramic disc having a central opening to a metal shaft comprising:
   chamfering at least a portion of the opening in the disc to increase the lateral spacing of a portion of the disc from the shaft;
   metallizing the chamfered portion of the disc adjacent to the opening;
   inserting the shaft in said opening with the chamfered portion upward and in a selected peripheral position thereon;
   inserting a strip of metal having a low fusion temperature on said shaft adjacent to the chamfered portion in said disc; and
   applying heat to melt said metallic strip thereby bonding said disc to said shaft.

References Cited
UNITED STATES PATENTS

| | | | |
|---|---|---|---|
| 2,972,808 | 2/1961 | Litton | 29—473.1 |
| 3,001,269 | 9/1961 | Moore | 29—473.1 X |
| 3,046,651 | 7/1962 | Olmon | 29—473.1 X |
| 3,065,533 | 11/1962 | Dungan | 29—473.1 X |
| 3,137,545 | 6/1964 | Schultz | 29—195 |
| 3,302,961 | 2/1967 | Franklin | 29—473.1 X |

FOREIGN PATENTS
667,895  3/1952  Great Britain.

JOHN F. CAMPBELL, Primary Examiner
J. L. CLINE, Assistant Examiner

U.S. Cl. X.R.
29—473